US008180360B2

(12) United States Patent
Yang et al.

(10) Patent No.: US 8,180,360 B2
(45) Date of Patent: May 15, 2012

(54) DOWNLINK TRAFFIC CHANNEL RESOURCE ALLOCATION METHOD AND DATA TRANSMISSION METHOD FOR MULTI-CARRIER HSDPA

(75) Inventors: Guiliang Yang, Shanghai (CN); Shaohui Sun, Shanghai (CN); Yingmin Wang, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 795 days.

(21) Appl. No.: 11/994,770

(22) PCT Filed: Jun. 29, 2006

(86) PCT No.: PCT/CN2006/001505
§ 371 (c)(1),
(2), (4) Date: Jun. 13, 2008

(87) PCT Pub. No.: WO2007/003122
PCT Pub. Date: Jan. 11, 2007

(65) Prior Publication Data
US 2008/0299985 A1    Dec. 4, 2008

(30) Foreign Application Priority Data
Jul. 5, 2005    (CN) .......................... 2005 1 0080776

(51) Int. Cl.
*H04W 72/00* (2009.01)
*H04W 4/00* (2009.01)
(52) U.S. Cl. ..................................... 455/452.2; 370/329
(58) Field of Classification Search .................. 455/450, 455/451, 452.1, 452.2, 453, 454, 455; 370/329, 370/330, 341
See application file for complete search history.

(56) References Cited

U.S. PATENT DOCUMENTS

| | | | | |
|---|---|---|---|---|
| 6,094,584 A * | 7/2000 | Khanna et al. | ................ | 455/512 |
| 6,519,462 B1 * | 2/2003 | Lu et al. | ........................ | 455/453 |
| 6,580,913 B1 * | 6/2003 | Chao et al. | ................. | 455/452.1 |
| 6,597,907 B1 * | 7/2003 | Pruitt et al. | ................... | 455/423 |

(Continued)

FOREIGN PATENT DOCUMENTS

CN    1568032    1/2005

OTHER PUBLICATIONS

Office action issued by Chinese Patent Office for priority Chinese application CN200510080776.X, 2009.

(Continued)

*Primary Examiner* — Christopher M Brandt
(74) *Attorney, Agent, or Firm* — Frommer Lawrence & Haug LLP; Ronald R. Santucci

(57) ABSTRACT

The present invention discloses a method of allocating downlink traffic channel resources for multi-carrier HSDPA, and the method includes: first of all, selecting a carrier with the optimum channel condition; determining whether the carrier meets the resource allocation demand of a downlink traffic channel, if yes, allocating resources that meet the downlink traffic channel on the carrier; otherwise, allocating the available resources of the carrier to the downlink traffic channel, and selecting a carrier with the optimum channel condition from the remaining carriers for resource allocation according to the remaining resource allocation demand of the downlink traffic channel. The present invention provides, according to the transmission characteristic of the existing HSDPA multi-carrier, a method for allocating downlink traffic channel resources, which method is applicable for packet data transmission of the multi-carrier HSDPA.

10 Claims, 1 Drawing Sheet

U.S. PATENT DOCUMENTS

| | | | |
|---|---|---|---|
| 7,277,392 B2 * | 10/2007 | Venteicher et al. | 370/237 |
| 7,324,431 B2 * | 1/2008 | Lestable | 370/203 |
| 7,346,043 B1 * | 3/2008 | Olshansky et al. | 370/352 |
| 2002/0042275 A1 * | 4/2002 | Kitazawa et al. | 455/452 |
| 2003/0125039 A1 | 7/2003 | Lachtar et al. | |
| 2004/0081127 A1 * | 4/2004 | Gardner et al. | 370/338 |
| 2004/0125743 A1 * | 7/2004 | Hashem et al. | 370/208 |
| 2005/0111431 A1 * | 5/2005 | Gotesman et al. | 370/347 |
| 2005/0136934 A1 * | 6/2005 | Alard | 455/450 |
| 2005/0136937 A1 * | 6/2005 | Qian et al. | 455/452.2 |
| 2005/0181802 A1 * | 8/2005 | Utakouji | 455/453 |
| 2005/0265299 A1 * | 12/2005 | Franceschini et al. | 370/342 |
| 2006/0013338 A1 * | 1/2006 | Gore et al. | 375/324 |
| 2006/0056373 A1 * | 3/2006 | Legg | 370/341 |

OTHER PUBLICATIONS

Article reference by Chinese Patent Office in the above office action for priority Chinese application CN200510080776.X. Also English translation of article reference, 2002.

* cited by examiner

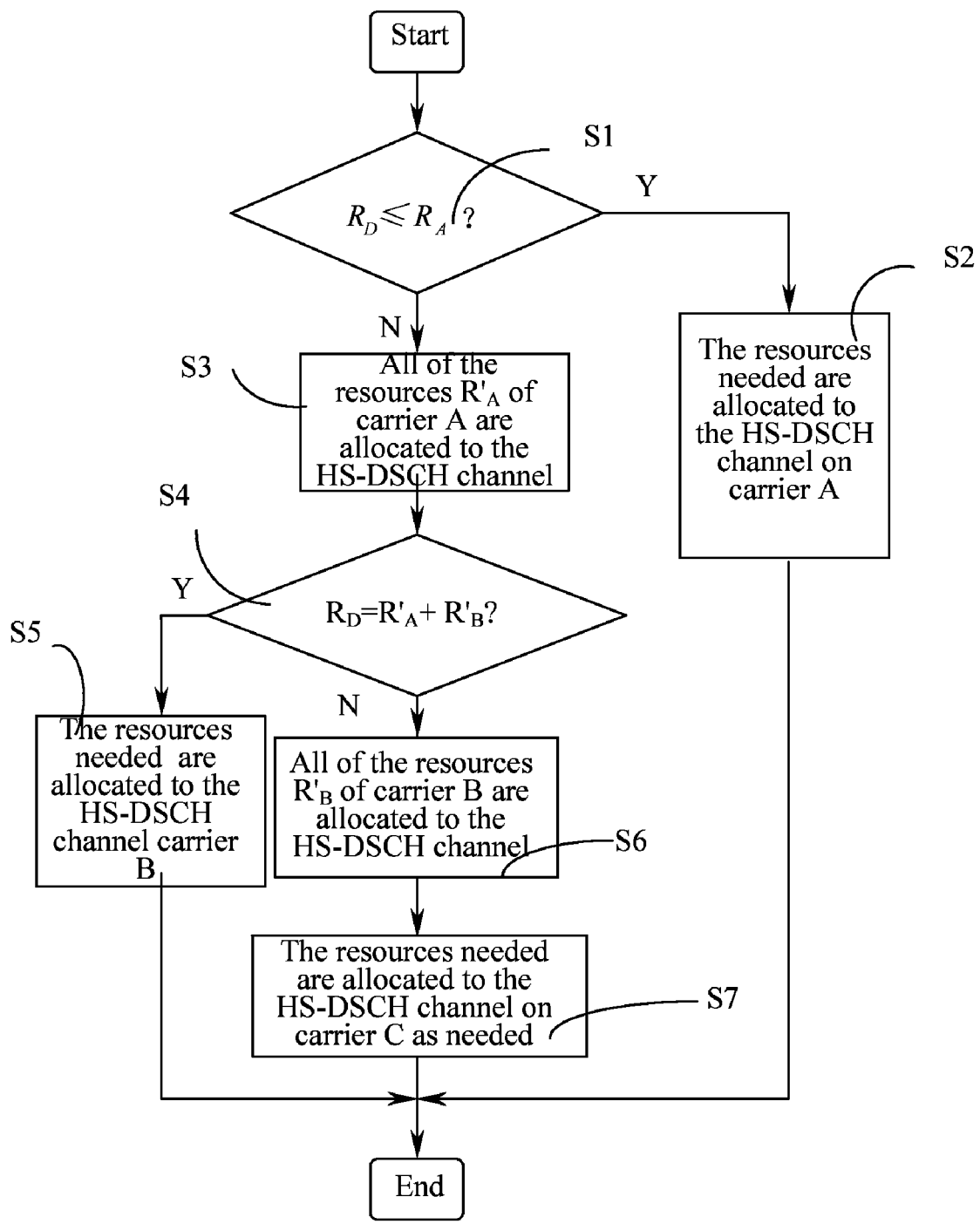

DOWNLINK TRAFFIC CHANNEL RESOURCE ALLOCATION METHOD AND DATA TRANSMISSION METHOD FOR MULTI-CARRIER HSDPA

This application is a 371 of PCT/CN2006/001505 filed on Jun. 29, 2006 and published on Jan. 11, 2007 under publication number WO 2007/003122 A which claims priority benefits from Chinese Patent Application No. 200510080776.X filed Jul. 5, 2005, the disclosure of which is hereby incorporated by reference.

FIELD OF THE INVENTION

The present invention relates to a multi-carrier resource allocation method, and in particular to a method of allocating downlink traffic channel resources for multi-carrier HSDPA and a method of transmitting data.

BACKGROUND OF THE INVENTION

The capability to support high-speed mobile packet data services is one of the most important characteristics of a 3G system. In order to meet requirements of data services, such as video, streaming media and download, that have strict requirements on traffic and delay, improvements have been made to air interface(s) by 3GPP, and High Speed Downlink Packet Access (HSDPA) technology is introduced. The HSDPA not only supports high-speed asymmetric data services, but also minimizes the operator's input cost with network capacity increased greatly at the same time.

In the current R5 specifications, the HSDPA of a TD-SCDMA system employs single carrier transmission mode; in other words, a user receives all traffic channel data on one carrier. The peak rate of the TD-SCDMA system to send data using the HSDPA technology is influenced due to limitations on signal bandwidth. With the development of Internet and information society, demand on such services as real-time download and streaming media, and complex network and multimedia services such as applications of multi-user game, real-time message, online shopping, private/public database access and movie download, etc., increases year by year. Moreover, requirements on packet data transmission rate also become stricter, and cellular systems are expected to provide data transmission capability with higher transmission rate and less delay. To meet these requirements and further improve the data transmission rate of the TD-SCDMA system, the invention provides a multi-carrier HSDPA technology for realizing HSDPA based on resources of multiple carriers and enhancing packet data service transmission capability.

Since the packet data service of the multi-carrier HSDPA transmits data on a downlink traffic channel, resource allocation for a downlink traffic channel needs to be first performed so as to realize packet data transmission of the multi-carrier HSDPA. However, the HSDPA of the current TD-SCDMA system employs a single carrier transmission mode and the traffic channel resource allocation method thereof is based on a single carrier mode. Therefore, in order to realize the multi-carrier HSDPA in the TD-SCDMA system, the problem of how to perform corresponding downlink traffic channel resource allocation needs to be resolved.

SUMMARY OF THE INVENTION

An object of the invention is to provide a method of allocating downlink traffic channel resources and a method of transmitting packet data for the multi-carrier HSDPA, thereby realizing the allocation of downlink traffic channel resource for the multi-carrier HSDPA, and further realizing the transmission of packet data for the multi-carrier HSDPA.

To solve the above technical problem, the invention provides a method of allocating downlink traffic channel resources for multi-carrier HSDPA, comprising:

1) selecting a carrier with optimum channel conditions;
2) determining whether the carrier meets resource demand of a downlink traffic channel, if yes, turning to step 3); otherwise, turning to step 4);
3) allocating resources that meet the resource demand of the downlink traffic channel on the carrier, and finishing processing of the method;
4) allocating the available resources of the carrier to the downlink traffic channel, and selecting, according to remaining resource demand of the downlink traffic channel, a carrier with the optimum channel conditions among the remaining carriers for carrying out the resource allocation.

According to an embodiment of the invention, the channel conditions comprise interference degree of the carrier.

According to an embodiment of the invention, the channel conditions further comprise base station capability, service status and traffic load status.

According to an embodiment, the method further comprises the following step before the step 1):

sequencing the available downlink traffic channel resources of the carriers according to the channel conditions.

Additionally, according to an embodiment, the method further comprises the following step before the step 1): obtaining, from a terminal, measurement information carrying information of the interference degree.

The invention further provides a method of transmitting packet data for multi-carrier HSDPA, comprising:

1) establishing a downlink traffic channel and corresponding uplink control and downlink control channels;
2) selecting a carrier with optimum channel conditions;
3) determining whether the carrier meets resource demand of the downlink traffic channel, if yes, turning to step 4); otherwise, turning to step 5);
4) allocating resources that meet the resource demand of the downlink traffic channel on the carrier, and turning to step 6;
5) allocating the available resources of the carrier to the downlink traffic channel, and selecting, according to remaining resource demand of the downlink traffic channel, a carrier with the optimum channel conditions from the remaining carriers for carrying out the resource allocation;
6) sending, via the downlink control channel, control information necessary for a user terminal to receive the packet data, so that the user terminal may receive the control information; and
7) receiving a response message for data sending fed back by the uplink control channel, and sending the packet data according to the resources allocated to the downlink traffic channel.

According to an embodiment of the invention, the channel conditions comprise interference degree of the carrier.

According to an embodiment of the invention, the channel conditions further comprise base station capability, service status and traffic load status.

The invention further provides a radio network controller for allocating downlink traffic channel resources for multi-carrier HSDPA, wherein the radio network controller comprises a downlink traffic channel allocation device that comprises a resource storage unit, a selection unit and a resource allocation unit, wherein:

the resource storage unit is adapted to store information of available downlink traffic channel resources of respective carriers;

the selection unit is coupled with the resource storage unit and the resource allocation unit, for obtaining, from the resource storage unit, the available downlink traffic channel resources of a carrier that is not allocated and corresponding channel condition information, and selecting the available downlink traffic channel resources of the carrier with the optimum channel conditions; and the resource allocation unit is adapted to obtain, from the selection unit, the available downlink traffic channel resources for allocation.

According to an embodiment of the invention, the channel condition information comprises interference degree.

In comparison with the prior art, the invention has the following beneficial effects. In the downlink traffic channel resources method applicable to the packet data transmission of the multi-carrier HSDPA according to the invention, the resources are allocated according to channel condition of the carriers, so that the allocation of the downlink traffic channel resources of the multi-carrier HSDPA may be realized. Further, the packet data transmission of the multi-carrier HSDPA may be realized.

In the invention, interference on each carrier is used as a main factor during resource allocation, and the interference on each carrier may be obtained via measurement information fed back by a terminal, thereby reducing realization difficulty on the network side. At the same time, since the interference is the main problem that needs to be considered in the current network, resource allocation will be more reasonable.

BRIEF DESCRIPTION OF THE DRAWINGS

FIG. 1 is a flow chart of the method of allocating the downlink traffic channel resources for the multi-carrier HSDPA according to a first embodiment of the invention.

DETAILED DESCRIPTION OF THE EMBODIMENTS

When a radio network controller (RNC) decides to implement the HSDPA by employing resources of multiple carriers simultaneously in a certain cell, i.e., the multi-carrier HSDPA, the RNC first determines the channel resources to be employed according to the network load status, channel conditions, interference status, service type and requirements, etc. The channel resources comprise carriers, time slots and code channels, etc. If needed, the RNC determines the channel resources such as the carriers, time slots and code channels, etc., to be employed by a Node B of the cell to form HSDPA channels. HSDPA channels comprise the HS-DSCH traffic channel, the HS-SCCH channel and the HS-SICH control channel. Multiple pairs of HS-SCCH and HS-SICH exist in the multi-carrier HSDPA, and they may be allocated on different carriers. The resources forming each of the HS-SCCH channel and HS-SICH channel cannot be allocated across carriers, in other words, the channel resources of each of the HS-SCCH channel and HS-SICH channel are limited in one carrier. There is only one HS-DSCH channel in each multi-carrier HSDPA cell, and the resources of the HS-DSCH channel may be allocated across carriers. The resources of multiple carriers are bound together to form an HS-DSCH channel.

As directed to characteristics of downlink traffic channel resources in the multi-carrier HSDPA system, the invention provides a resource allocation method for the HS-DSCH, wherein the available downlink channel resources of the multiple carriers are taken as a unity and allocated uniformly. The specific implementation of the method is as follows. The network side determines, according to information concerning utilization of current network resources, load, interference and resources reserved for handover, etc., the resources of each carrier that may be used for the downlink traffic channel, selects a carrier with the optimum channel conditions, and allocates resources to the downlink traffic channel on the carrier with the optimum channel condition. If the available downlink traffic channel resources of the carrier can provide the enough resources that need to be allocated by the system to the multi-carrier HSDPA downlink traffic channel, the resources needed are allocated to the HS-DSCH channel on the carrier, and otherwise the available downlink traffic channel resources of the carrier with the optimum channel condition cannot provide the downlink traffic channel resources needed by the downlink traffic channel, the available downlink traffic channel bandwidth of the carrier is allocated to the downlink traffic channel, and after that, resources are allocated to the downlink traffic channel on the carrier with the optimum channel conditions among the remaining carriers.

Since the greatest problem of the CDMA system is interference limitations, the interference is one of the main considerations for resource scheduling. Therefore, the channel conditions involved in the invention first refer to the interference degree of each carrier. In addition, the channel conditions further comprise base station capability, service status and traffic load status.

FIG. 1 shows a specific embodiment of the method of allocating the downlink traffic channel resources for the multi-carrier HSDPA according to the invention.

First Embodiment

For easy understanding, this embodiment will be described by taking the case in which the number of the multiple carriers is 3 as an example. The three carriers are named as carrier A, carrier B and carrier C, respectively.

For the channel resource allocation of the multi-carrier HS-DSCH, the resources of the three carriers are considered as a unity and allocated uniformly. First of all, the network side determines amount of the available resources according to the utilization of the current network resources, load, interference and resources reserved for handover, etc. It is assumed that the channel resources available to downlink transmission of the carriers A, B and C are $R_A$, $R_B$ and $R_C$, respectively, wherein the resources that may be used for the HS-DSCH channel are $R'_A$, $R'_B$ and $R'_C$, respectively. The interferences on the carriers A, B and C are $L_A$, $L_B$ and $L_C$, respectively. For the multi-carrier HSDPA system, a great difference may exist between the channel conditions of each carrier due to the usage of multiple carrier channels. For example, in the HSDPA system employing the three carriers, as for the carrier C, the load of a neighboring cell on this carrier frequency is heavy, thus a large interference will be laid on the carrier C of the present cell, thereby seriously influencing the transmission efficiency of the system. It is assumed that the following correlation exists among the interferences on the three carriers obtained according to measurement information fed back by a UE:

$$L_C \geq L_B \geq L_A \qquad (1)$$

In other words, the interference on the carrier C is the largest, and the interference on the carrier A is the smallest.

The specific allocating process is shown in FIG. 1. When the three-carrier HSDPA system allocates resources for a HS-DSCH channel, the system first allocates the channel resources of the carrier A to the HS-DSCH channel, and then determines whether the available downlink traffic channel resources of the carrier A are less than resources needed by the downlink traffic channel (S1). If the available downlink traffic channel resources of the carrier A are larger than or equal to the channel resources needed by the downlink traffic channel, the resources needed are allocated to the downlink traffic channel (S2); and if the resources of the carrier A are less than the resources needed by the downlink traffic channel, all the available downlink traffic channel resources of the carrier A are allocated to the downlink traffic channel (S3), and then the system further determines whether the available downlink traffic channel resources of the carrier A and carrier B meet the demand of the downlink traffic channel (S4). If yes, the resources of the carrier B are allocated to HS-DSCH channel (S5); otherwise, when the resources of the carrier B still cannot meet the demand of the HS-DSCH channel, all of the available downlink resources of the carrier B are allocated to the downlink traffic channel (S6), and in addition, the resources of the carrier C are allocated to the HS-DSCH channel (S7).

In the multi-carrier HSDPA of a TDD system, it may be assumed that there exist three carriers A, B and C in a cell, and each carrier employs an uplink/downlink allocation time slot configuration of 1:5. The channel available to downlink transmission of each carrier has code channel resource of 5 time slots. In addition to the resources for the common channel, dedicated channel and other access channels, the resources of each carrier that may be allocated to the HS-DSCH channel and HS-SCCH channel of the HSDPA are $R'_A$, $R'_B$ and $R'_C$, respectively. If the resources allocated by the network side to the HS-DSCH and HS-SCCH channel for the entire cell is $R_D$, and the network side learns, according to the measurement information reported by the terminal, that the interference on each carrier is $L_A$, $L_B$ and $L_C$, respectively, wherein the interference $L_C$ on the carrier C is the largest, the interference $L_B$ on the carrier B is the second largest, and the interference $L_A$ on the carrier A is the smallest. Thus, the network will first consider allocating resources to the HS-DSCH channel and HS-SCCH channel on the carrier A. If the available resources $R'_A$ on the carrier A are insufficient to meet the demand, the resources on the carrier B may be allocated for the HSDPA, and if the demand still cannot be met, the resources of the carrier C are allocated finally.

Moreover, the invention further provides a method of transmitting packet data for the multi-carrier HSDPA. In order to transmit data traffic for the HSDPA, the channel resources needed for data transmission shall be allocated to the HS-DSCH, that is, resources are allocated to the downlink traffic channel on the carrier with the optimum channel conditions. If the available downlink traffic channel resources of the carrier with the optimum channel conditions are less than the downlink traffic channel resources needed by the downlink traffic channel, after the available downlink traffic bandwidth of the carrier has been allocated, resources on the carrier with the optimum channel conditions among the remaining carriers are allocated to the downlink traffic channel.

Before sending packet data to a UE via the HS-DSCH channel, the network first sends, via the downlink control channel HS-SCCH, control information necessary for the UE to receive the packet data, so that the UE may receive the control information. The packet data is sent according to the resources allocated to the downlink traffic channel after response information for data sending fed back by the uplink control channel has been received.

This process will now be described in detail in conjunction with a second embodiment of the invention.

Second Embodiment

For example, in a TDD system, the network side learns the network load status according to the measurement information reported by a terminal, measurement result of the network side and request information of the current service, etc. Moreover, it is determined whether to provide the HSDPA service to a certain cell according to the network load status. If it is determined to provide the HSDPA service to a certain cell, the RNC will select N carriers, among the total M carriers that can be provided by the Node B, to meet the demand of the HSDPA according to the interference status of the cell, the capability of the Node B, the service status and traffic load status.

In the multi-carrier HSDPA of the TDD system, it is assumed that there exist three carriers A, B and C in a cell, and each carrier employs an uplink/downlink allocation time slot configuration of 1:5. The channel available to downlink transmission of each carrier has code channel resource of 5 time slots. In addition to the resources for the common channel, dedicated channel and other access channels, the resources of each carrier that may be allocated to the HS-DSCH channel and HS-SCCH channel of the HSDPA are $R'_A$, $R'_B$ and $R'_C$, respectively. If the resources allocated by the network side to the HS-DSCH channel and HS-SCCH channel for the entire cell is $R_D$, and the network side learns, according to the measurement information reported by the terminal, that the interference on each carrier is $L_A$, $L_B$ and $L_C$, respectively, wherein the interference $L_C$ on the carrier C is the largest, the interference $L_B$ on the carrier B is the second largest, and the interference $L_A$ on the carrier A is the smallest. Thus, the network will first consider allocating resources to the HS-DSCH channel and HS-SCCH channel on the carrier A. If the available resources $R'_A$ on the carrier A are insufficient to meet the demand, the resources on the carrier B may be allocated for the HSDPA, and if the demand still cannot be met, the resources of the carrier C are allocated finally.

When communication is carried out by using the resources allocated to the downlink traffic channel, corresponding notification information, which notification information comprises control information such as the employed time slot, channel, modulation mode, data block size, redundance version number and retransmission identifier, etc., is first sent to the UE via the HS-SCCH channel, so that the UE may correctly receive the data sent via the HS-DSCH. The UE performs demodulation, decoding and CRC check on the received data. If any error occurs and the number of the retransmission does not exceed the maximum retransmission number, the network side is notified via the HS-SICH channel to retransmit the data; and if any error occurs and the number of the retransmission exceeds the maximum retransmission number, the data is discarded and the network side is notified to send new data. If no error occurs, the network side may be notified to send new data. A response message for data sending and a channel quality indication message of the UE are sent together via the HS-SICH channel. After receiving the messages sent via the HS-SICH channel, the network starts to transmit packet data on the HS-DSCH channel.

The allocation of downlink traffic channel resources according to the invention is accomplished by a radio network controller, and therefore, the invention further provides a radio network controller adapted to allocate the downlink traffic channel resources for the multi-carrier HSDPA. The radio network controller comprises a downlink traffic channel allocation device which comprises a resource storage unit, a selection unit and a resource allocation unit. The resource storage unit is adapted to store information of available downlink traffic channel resources of respective carriers; the selection unit is coupled with the resource storage unit and the resource allocation unit, for obtaining, from the resource storage unit, the available downlink traffic channel resources of a carrier that is not allocated and corresponding channel condition information, and selecting the available downlink traffic channel resources of the carrier with the optimum channel conditions; and the resource allocation unit is adapted to obtain, from the selection unit, the available downlink traffic channel resources for carrying out the allocation.

Although the preferred embodiments of the invention have been described above, various improvements and modifications will readily occur to those skilled in the art without departing from the spirit of the invention. Such improvements and modifications are intended to be encompassed in the scope of the invention.

The invention claimed is:

1. A method of allocating downlink traffic channel resources for multi-carrier High Speed Data Packet Access (HSDPA), comprising:
   1) selecting a carrier with optimum channel conditions;
   2) determining whether the carrier meets resource demand of a downlink traffic channel, if yes, turning to step 3); otherwise, turning to step 4);
   3) allocating resources that meet the resource demand of the downlink traffic channel on the carrier, and finishing processing of the method;
   4) allocating all the available resources of the carrier to the downlink traffic channel, and then selecting, according to remaining resource demand of the downlink traffic channel, another carrier with optimum channel conditions among the remaining carriers and allocating remaining resources on another carrier, until the resource demand of the downlink traffic channel is met.

2. The method of allocating downlink traffic channel resources for multi-carrier HSDPA according to claim 1, wherein the channel conditions comprise interference degree of the carrier.

3. The method of allocating downlink traffic channel resources for multi-carrier HSDPA according to claim 2, wherein, the channel conditions further comprise base station capability, service status and traffic load status.

4. The method of allocating downlink traffic channel resources for multi-carrier HSDPA according to claim 2, further comprising the following step before the step 1): sequencing the available downlink traffic channel resources of the carriers according to the channel conditions.

5. The method of allocating downlink traffic channel resources for multi-carrier HSDPA according to claim 4, further comprising the following step before the step 1): obtaining, from a terminal, measurement information carrying information of the interference degree.

6. A method of transmitting packet data for multi-carrier High Speed Data Packet Access (HSDPA), comprising:
   1) establishing a downlink traffic channel and corresponding uplink control and downlink control channels;
   2) selecting a carrier with optimum channel conditions;
   3) determining whether the carrier meets resource demand of the downlink traffic channel, if yes, turning to step 4); otherwise, turning to step 5);
   4) allocating resources that meet the resource demand of the downlink traffic channel on the carrier, and turning to step 6);
   5) allocating all the available resources of the carrier to the downlink traffic channel, and then selecting, according to remaining resource demand of the downlink traffic channel, another carrier with optimum channel conditions from the remaining carriers and allocating remaining resources on another carrier, until the resource demand of the downlink traffic channel is met;
   6) sending, via the downlink control channel, control information necessary for a user terminal to receive the packet data, so that the user terminal may receive the control information; and
   7) receiving a response message for data sending feedback by the uplink control channel, and sending the packet data according to the resources allocated to the downlink traffic channel.

7. The method of transmitting packet data for multi-carrier HSDPA according to claim 6, wherein the channel conditions comprise interference degree of the carrier.

8. The method of transmitting packet data for multi-carrier HSDPA according to claim 7, wherein the channel conditions further comprise base station capability, service status and traffic load status.

9. A radio network controller for allocating downlink traffic channel resources for multi-carrier High Speed Data Packet Access (HSDPA), wherein the radio network controller comprises a downlink traffic channel allocation device that comprises a resource storage unit, a selection unit and a resource allocation unit, wherein:
   the resource storage unit is adapted to store information of available downlink traffic channel resources of respective carriers;
   the selection unit is coupled with the resource storage unit and the resource allocation unit, for obtaining, from the resource storage unit, the available downlink traffic channel resources of a carrier that is not allocated and corresponding channel condition information, and selecting the available downlink traffic channel resources of the carrier with the optimum channel conditions; and
   the resource allocation unit is adapted to obtain, from the selection unit, the available downlink traffic channel resources for allocation;
   wherein when a carrier with optimum channel conditions, which is selected by the selection unit, already meets resource demand of a downlink traffic channel, the resource allocation unit is adapted to allocate resources firstly on the carrier with optimum channel conditions and then on another carrier with optimum channel conditions among the remaining carriers, until the resource demand of the downlink traffic channel is met.

10. The radio network controller according to claim 9, wherein, the channel condition information comprises interference degree.

* * * * *